(12) United States Patent
Kato

(10) Patent No.: US 12,443,730 B2
(45) Date of Patent: Oct. 14, 2025

(54) IMAGE PROCESSING DEVICE AND IMAGE PROCESSING METHOD

(71) Applicant: TOSHIBA TEC KABUSHIKI KAISHA, Tokyo (JP)

(72) Inventor: Hiroyuki Kato, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 352 days.

(21) Appl. No.: 17/534,616

(22) Filed: Nov. 24, 2021

(65) Prior Publication Data
US 2022/0261488 A1 Aug. 18, 2022

(30) Foreign Application Priority Data

Feb. 12, 2021 (JP) ................................ 2021-020516

(51) Int. Cl.
*G06F 21/62* (2013.01)
*G06F 11/362* (2025.01)
*G06F 11/3698* (2025.01)
*G06F 21/60* (2013.01)
*H04N 1/00* (2006.01)

(52) U.S. Cl.
CPC ........ *G06F 21/6209* (2013.01); *G06F 11/362* (2013.01); *G06F 11/3698* (2025.01); *G06F 21/602* (2013.01); *H04N 1/00206* (2013.01); *H04N 2201/3281* (2013.01); *H04N 2201/3284* (2013.01)

(58) Field of Classification Search
CPC ............... G06F 21/6209; G06F 11/362; G06F 11/3664; G06F 21/602; G06F 11/3692; G06F 11/3636; H04N 1/00206; H04N 2201/3281; H04N 2201/3284; H04N 1/00938; H04N 1/32272; H04N 1/32358
See application file for complete search history.

(56) References Cited

U.S. PATENT DOCUMENTS 6,622,184 B1 * 9/2003 Tabe ....................... G06F 21/74
710/36
7,380,282 B2 5/2008 Song et al.
(Continued)

FOREIGN PATENT DOCUMENTS

JP 07-254960 10/1995
JP 2008-15655 1/2008
(Continued)

OTHER PUBLICATIONS

Extended European Search Report for European Patent Application No. 22156084.0 dated Jun. 13, 2022.
(Continued)

*Primary Examiner* — Abu S Sholeman
(74) *Attorney, Agent, or Firm* — Amin, Turocy & Watson, LLP

(57) ABSTRACT

According to one embodiment, an image processing device includes storage means, encryption means, and output means. The storage means stores an encryption key in correlation with a built-in application during installation of the built-in application. The encryption means encrypts a debug log relating to the built-in application with the encryption key in correlation with the corresponding built-in application. The output means outputs the debug log encrypted by the encryption means.

15 Claims, 9 Drawing Sheets

(56) References Cited

U.S. PATENT DOCUMENTS

| | | | |
|---|---|---|---|
| 9,542,302 B2 | 1/2017 | Sun | |
| 2004/0076300 A1* | 4/2004 | Ishidoshiro | H04L 63/06 380/277 |
| 2008/0250385 A1* | 10/2008 | Sanchez | G06F 8/61 717/100 |
| 2009/0063842 A1* | 3/2009 | Azami | G06F 8/65 713/2 |
| 2010/0062770 A1* | 3/2010 | Flynn | H04W 12/12 455/466 |
| 2012/0047499 A1* | 2/2012 | Krzystofczyk | G06F 21/121 717/174 |
| 2014/0002845 A1* | 1/2014 | Gutnik | G06F 3/1287 358/1.14 |
| 2017/0293769 A1* | 10/2017 | Quinlan | G06F 3/0637 |
| 2017/0337114 A1 | 11/2017 | Lu et al. | |
| 2019/0196801 A1* | 6/2019 | Sasaki | H04L 9/3242 |
| 2019/0227908 A1 | 7/2019 | Munafo et al. | |
| 2021/0014366 A1 | 1/2021 | Nakashima | |
| 2021/0342463 A1* | 11/2021 | Tsirkin | H04L 63/123 |
| 2022/0083442 A1* | 3/2022 | Hanham | G06F 11/3656 |
| 2022/0365865 A1* | 11/2022 | Chen | G06F 11/3636 |

FOREIGN PATENT DOCUMENTS

| | | |
|---|---|---|
| JP | 2008-21066 | 1/2008 |
| JP | 2010-287108 | 12/2010 |
| JP | 2013-225823 | 10/2013 |
| JP | 2015-169996 | 9/2015 |

OTHER PUBLICATIONS

Japanese Office Action for Japanese Patent Application No. 2021-020516 dated Jul. 2, 2024.

Japanese Office Action for Japanese Patent Application No. 2021-020516 dated Nov. 19, 2024.

* cited by examiner

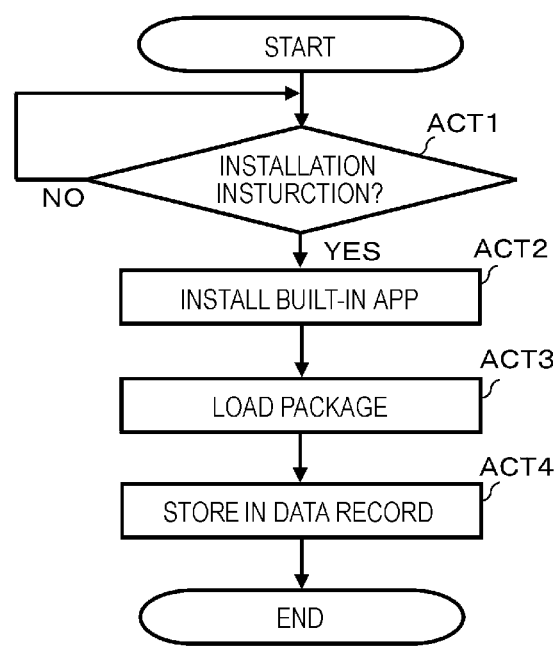

IMAGE PROCESSING DEVICE AND IMAGE PROCESSING METHOD

CROSS-REFERENCE TO RELATED APPLICATION

This application is based upon and claims the benefit of priority from Japanese Patent Application No. 2021-020516, filed on Feb. 12, 2021, the entire contents of which are incorporated herein by reference.

FIELD

Embodiments described herein relate generally to an image processing device, an image processing method, and a diagnostic system for the image processing device.

BACKGROUND

In the related art, if malfunction occurs in a built-in application of an image processing device such as a digital multi-functional peripheral (MFP), an administrator, a maintenance person, or the like acquires a debug log according to the built-in application in which the malfunction occurs, from the image processing device and analyzes the debug log to find a cause of the malfunction. However, the debug log obtained from the image processing device is not limited to the debug log of the built-in application in which the malfunction occurs, and also includes a debug log of controller software installed in the image processing device. Further, since the debug log is encrypted, the debug log of the built-in application in which the malfunction occurs cannot be extracted without decrypting all debug logs acquired from the image processing device. Therefore, a mechanism of collecting a debug log of a desired built-in application with a simple operation is demanded.

DESCRIPTION OF THE DRAWINGS

FIG. 5 is a schematic diagram illustrating an example of an app table;

FIG. 6 is a flowchart illustrating a main control procedure of a processor of the MFP;

DETAILED DESCRIPTION

An object to be achieved by embodiments is to provide an image processing device and an image processing method capable of collecting a debug log of a desired built-in application with a simple operation.

In general, according to one embodiment, an image processing device includes storage means, encryption means, and output means. The storage means stores an encryption key in correlation with a built-in application during installation of the built-in application. The encryption means encrypts a debug log relating to the built-in application with the encryption key in correlation with the corresponding built-in application. The output means outputs the debug log encrypted by the encryption means.

Hereinafter, embodiments are described with reference to the drawings.

First Embodiment

Figure 1:
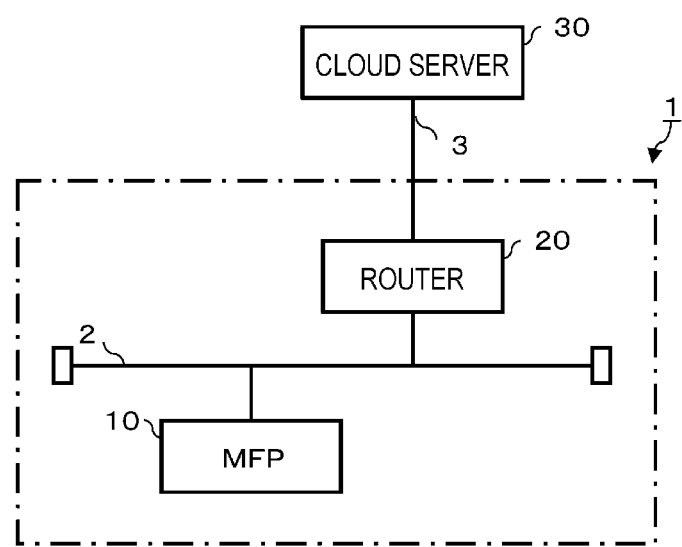
FIG. 1 is a schematic diagram illustrating a schematic configuration of an image processing system.

FIG. 1 is a block diagram illustrating a schematic configuration of an image processing system 1. The image processing system 1 includes an MFP 10 and a router 20. The MFP 10 is an example of the image processing device. The router 20 is connected to a cloud server 30 via a dedicated communication network 3. The dedicated communication network 3 is typically a dedicated digital line, an Integrated Services Digital Network (ISDN) line, or the like. The router 20 is a network device that relays data communication between each device connected to a communication network 2 and the cloud server 30. The cloud server 30 is a server device for cloud computing.

Figure 2:
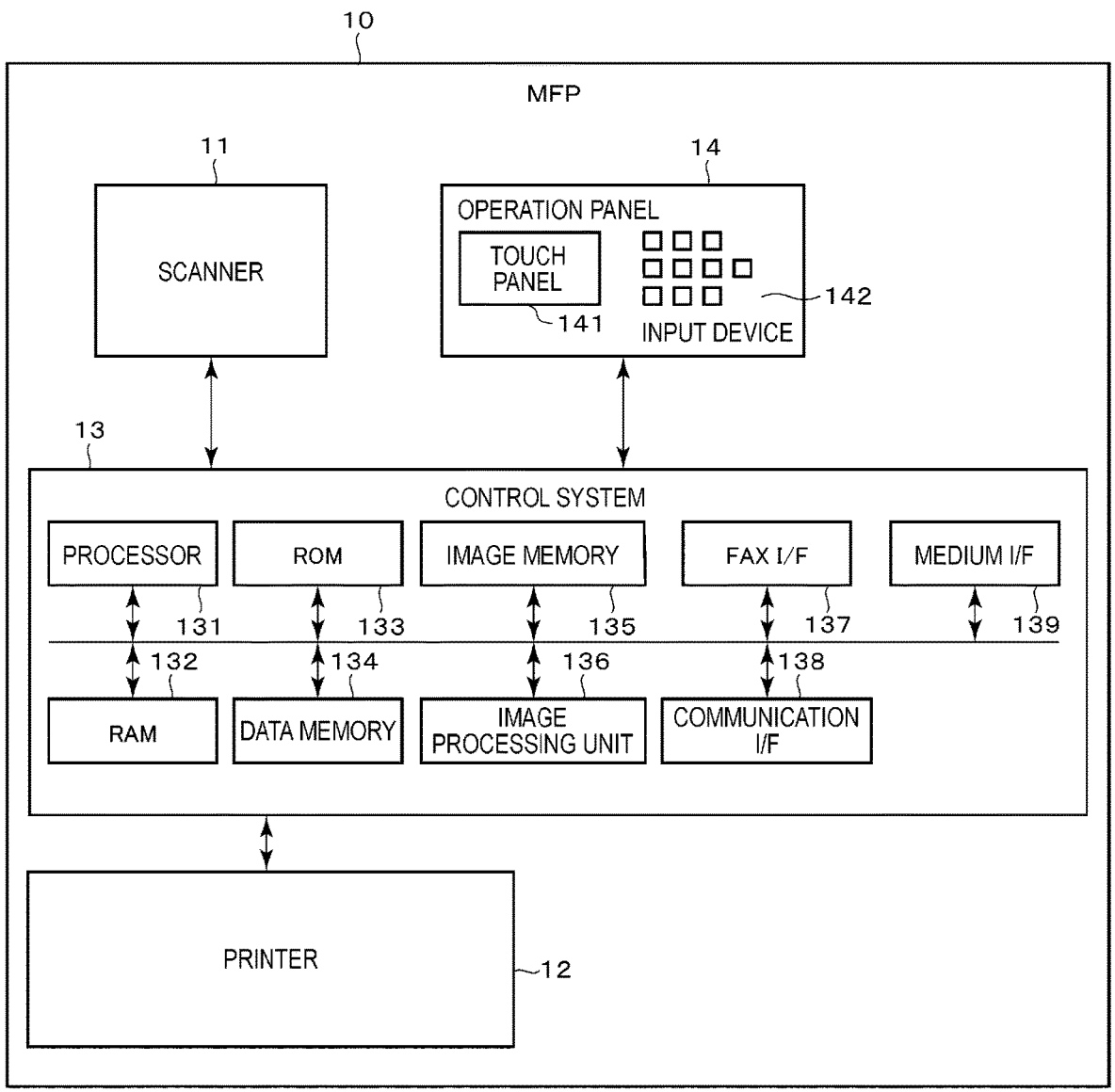
FIG. 2 is a block diagram illustrating a main circuit configuration of an MFP.

FIG. 2 is a block diagram illustrating a schematic configuration of the MFP 10. The MFP 10 includes a scanner 11, a printer 12, a control system 13, and an operation panel 14. The scanner 11, the printer 12, and the operation panel 14 are connected to the control system 13.

The scanner 11 is a device that optically reads an image of a document according to an operation instruction from the control system 13 and converts the image into image information. The scanner 11 outputs the image information of the read document to the control system 13.

The printer 12 prints an image based on the image information supplied from the control system 13 on paper in various printing conditions designated from the control system 13. As the printer 12, printers of various image forming methods can be applied. For example, the printer 12 may be a printer in an electrophotographic method, and may be a printer in an inkjet method or a thermal transfer method.

The control system 13 collectively controls an operation of each unit such as the scanner 11, the printer 12, and the operation panel 14. In addition, the control system 13 performs various processes such as image processing. The control system 13 includes a processor 131, a random-access memory (RAM) 132, a read-only memory (ROM) 133, a data memory 134, an image memory 135, an image processing unit 136, a facsimile (FAX) interface (I/F) 137, a communication interface (I/F) 138, and a medium interface (I/F) 139.

The processor 131 performs processes such as calculation and control according to programs. The processor 131 is, for example, a central processing unit (CPU). The processor 131 realizes various processing functions by executing programs stored in the ROM 133 or the data memory 134. The RAM 132 is a volatile memory. The RAM 132 functions, for example, as a working memory. The ROM 133 is a non-volatile memory. The ROM 133 functions, for example, as a program memory.

The data memory 134 stores control data, a control program, setting information, and the like. The data memory 134 is, for example, a rewritable non-volatile memory. The image memory 135 stores image information. The image processing unit 136 performs image processing with respect to image information.

The FAX interface 137 is an interface for performing FAX communication. The communication interface 138 is an interface for performing data communication with an external device via a network such as the communication network 2. The medium interface 139 is an interface for performing data communication with a storage medium such as a memory card or a universal serial bus (USB) memory.

The operation panel 14 is a user interface. The operation panel 14 includes a touch panel 141 and an input device 142. The touch panel 141 is obtained, for example, by stacking a display such as a liquid crystal display or an organic electro-luminescence (EL) display and a sensing device that detects touch input. The input device 142 is, for example, a button, keyboard, a keypad, or a touchpad.

The MFP 10 includes a built-in application database 40 in the data memory 134. Hereinafter, the built-in application is referred to as a built-in app. The built-in app database 40 is an assembly of built-in app data records 401 (see FIG. 3) generated for each MFP 10.

Figure 3:
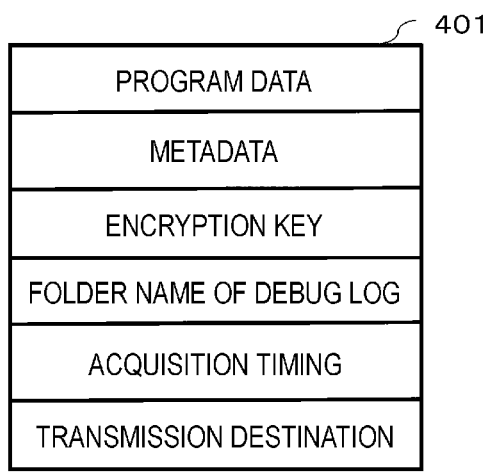
FIG. 3 is a schematic diagram illustrating a main data structure of a built-in app data record.

FIG. 3 is a schematic diagram illustrating a main data structure of the built-in app data record 401. As illustrated in FIG. 3, the built-in app data record 401 includes program data of the built-in app, metadata of the built-in app, an encryption key, a folder name of a debug log, an acquisition timing of the debug log, a transmission destination of the debug log, and the like. The built-in app is installed on the MFP 10 in the form of the package software. The package software includes program data of the built-in app, metadata of the built-in app, and an encryption key. The program data of the built-in app is data in which a program for executing the built-in app is written. The metadata of the built-in app is a built-in app ID, a name, and the vender information for generating the built-in app, and the like. The encryption key is a unique key set for each built-in app in order to encrypt the debug log of the built-in app. The folder name of the debug log is a name of a folder that is a storage destination for storing the debug log relating to the malfunction occurring during the execution of the built-in app. The folder of the debug log is generated for each built-in app if the package software is installed. After the package software is installed, a debug log setting screen 100 (see FIG. 4) is displayed on the touch panel 141.

Figure 4:
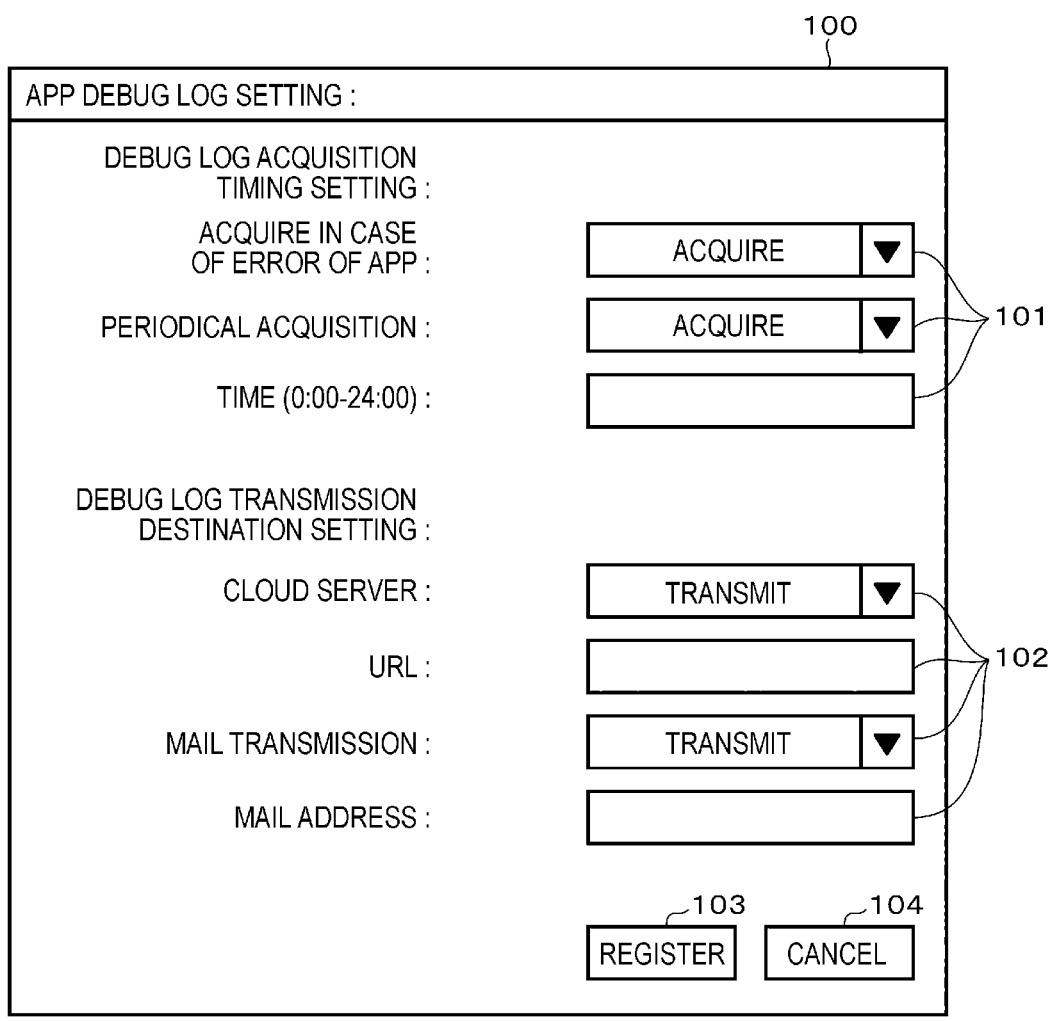
FIG. 4 is a schematic diagram illustrating an example of a debug log setting screen.

FIG. 4 is a schematic diagram illustrating an example of the debug log setting screen 100. As illustrated in FIG. 4, the debug log setting screen 100 includes an item field 101 that sets a timing for acquiring a debug log of the built-in app and an item field 102 that sets the transmission destination of the debug log. For example, whether to acquire the debug log in case of an error of the built-in app, whether to periodically acquire the debug log, or designated time in case where the debug log is to be periodically acquired are set in the item field 101. For example, whether to transmit the acquired debug log to the transmission destination and an address of the transmission destination in case of the transmission are set in the item field 102. The transmission destination is, for example, the cloud server 30, an administrator, a maintenance person. In case of the cloud server 30, a uniform resource locator (URL) is input as the address of the transmission destination. The URL is a unique address allocated to the cloud server 30. In case of the administrator or the maintenance person, the mail address of the administrator or the maintenance person is input. If the acquisition of the debug log is set for the item field 101, the item field 102 may be enabled. In addition, the debug log setting screen 100 includes a registration button 103 for instructing setting confirmation of the item field 101 and the item field 102 and a cancel button 104 for instructing setting cancellation of the item field 101 and the item field 102. The content of the text data displayed in FIG. 4 is an example.

The description refers back to FIG. 3.

The acquisition timing of the debug log and the transmission destination of the debug log are set on the debug log setting screen 100 in advance by the administrator. If the acquisition timing of the debug log and the transmission destination of the debug log are set, the setting is stored in the built-in app data record 401.

The description refers back to FIG. 2.

The MFP 10 stores an app table 1341 (see FIG. 5) in the data memory 134.

FIG. 5 is a schematic diagram illustrating an example of the app table 1341. As illustrated in FIG. 5, the app table 1341 is a data table configured in the app name, the acquisition flag, and the like. The app name is the name of the built-in app. The acquisition flag is set to "1" if the acquisition timing of the debug log is set on the debug log setting screen 100. The initial state of the acquisition flag is "0". The app table 1341 is not limited to the items of FIG. 5.

FIG. 6 is a flowchart illustrating the procedure of the information processes performed by the processor 131 of the MFP 10 if the administrator installs the built-in app in the MFP 10. Hereinafter, the operation of the MFP 10 is described with reference to this flowchart. The procedure of the operations described below and the contents thereof are examples. The procedure and the contents are not limited as long as the same result can be obtained.

The processor 131 of the MFP 10 waits for the instruction of the installation of the built-in app in ACT 1. If the installation of the built-in app is instructed, the processor 131 determines YES in ACT 1 and proceeds to ACT 2. The processor 131 installs the built-in app from the storage medium via the medium interface 139 in ACT 2.

The processor 131 loads the package software in ACT 3. As the package software, the entire package software may be encrypted. In such a case, the entire package software is decrypted, and the electronic signature is confirmed.

The processor 131 stores the program data of the built-in app, the metadata, and the encryption key included in the package software loaded in the process of ACT 3 in the built-in app data record 401 in ACT 4. The processor 131 stores the folder name of the folder of the debug log generated if the package software is installed in the built-in app data record 401. With the above, the processor 131 ends the information process of the procedure illustrated in the flowchart of FIG. 6.

Figure 7:
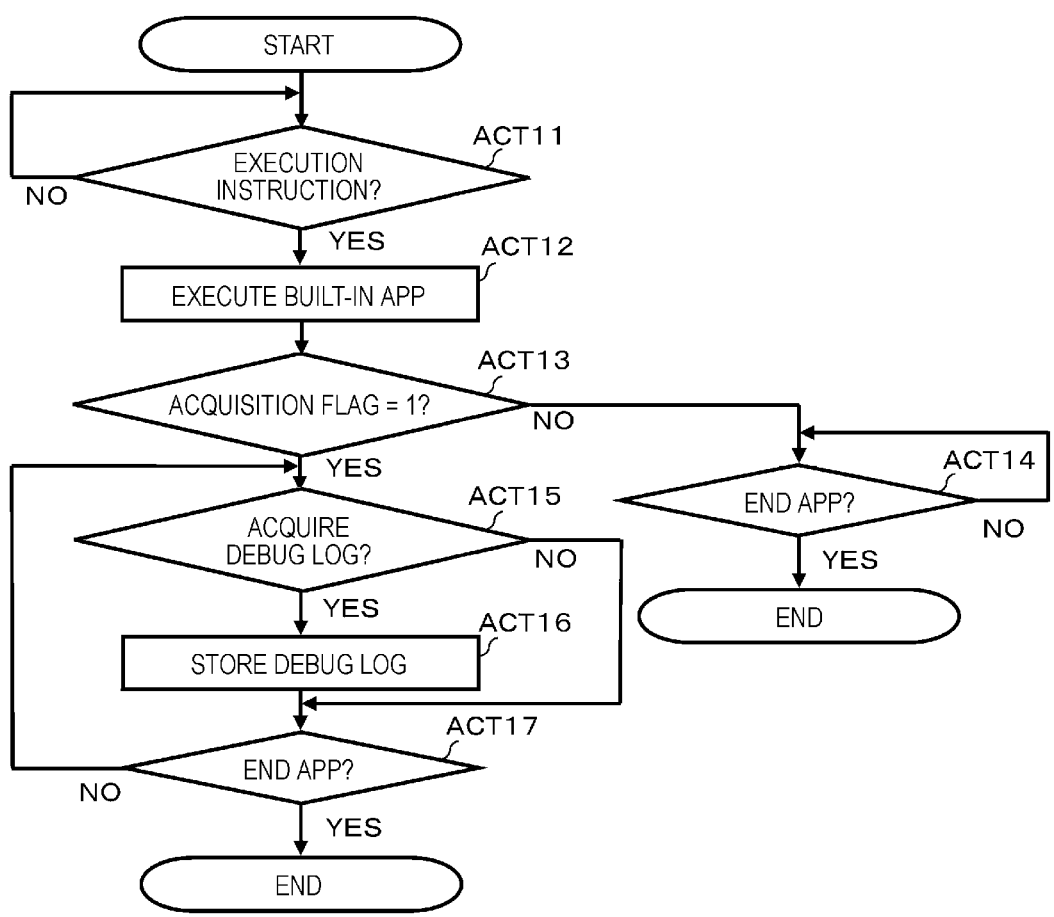
FIG. 7 is a flowchart illustrating the main control procedure of the processor of the MFP.

FIG. 7 is a flowchart illustrating the procedure of the information process performed by the processor 131 of the MFP 10 if the user who uses the MFP 10 executes the built-in app. Hereinafter, the operation of the MFP 10 is described with reference to this flowchart. The procedure of the operations and the contents thereof explained below are examples. The procedure and the contents are not limited as long as the same result can be obtained.

The processor 131 of the MFP 10 waits for the instruction of executing the built-in app in ACT 11. If the execution of the built-in app is instructed, the processor 131 determines YES in ACT 11 and proceeds to ACT 12. The processor 131 executes the built-in app in ACT 12.

The processor 131 confirms whether the acquisition flag of the app table 1341 is "1" in ACT 13. If the acquisition flag is not "1", that is, the acquisition flag is "0", the processor 131 determines NO in ACT 13 and proceeds to ACT 14.

The processor 131 confirms whether built-in app ends in ACT 14. If the built-in app ends, the processor 131 determines YES in ACT 14, and the processor 131 ends the information processes of the procedure illustrated in the flowchart of FIG. 7.

If the acquisition flag of the app table 1341 is "1", the processor 131 determines YES in ACT 13 and proceeds to ACT 15. The processor 131 confirms whether the acquisition timing of the debug log is stored in the built-in app data record 401 in ACT 15. If the acquisition timing of the debug log is not stored, the processor 131 determines NO in ACT 15 and proceeds to ACT 17 described below.

If the acquisition timing of the debug log is stored, the processor 131 determines YES in ACT 15 and proceeds to ACT 16. The processor 131 extracts the folder of the folder name of the debug log stored in the built-in app data record 401 and stores the debug log of the built-in app in the folder in ACT 16.

The processor 131 confirms whether the built-in app ends in ACT 17. If the built-in app does not end, the processor 131 determines NO in ACT 17 and returns to ACT 15. That is, the processor 131 repeatedly performs the processes of ACTS 15 to 17 until the built-in app ends.

If the built-in app ends, the processor 131 determines YES in ACT 17, and the processor 131 ends the information processes of the procedure illustrated in the flowchart of FIG. 7.

Figure 8:
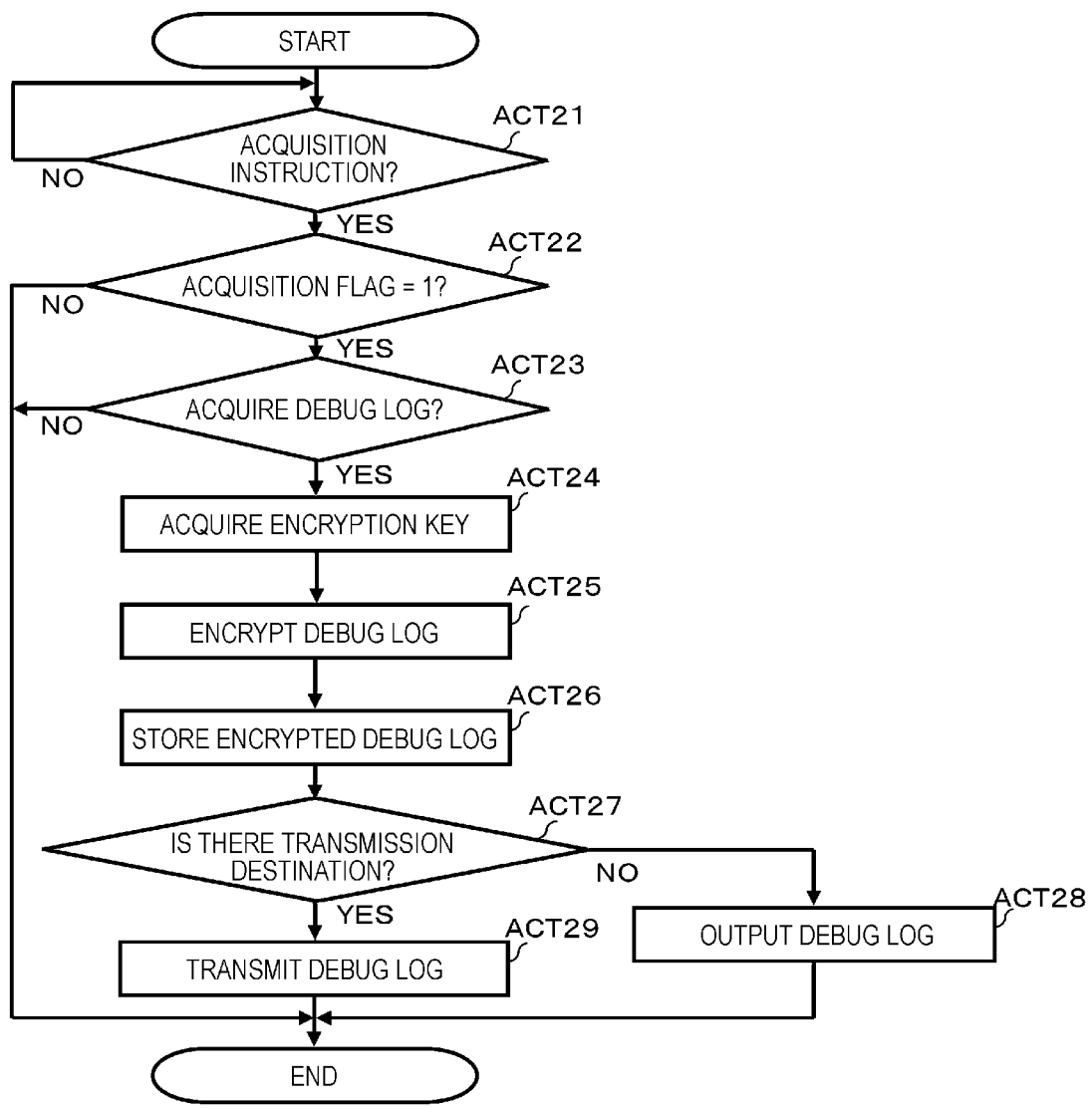
FIG. 8 is a flowchart illustrating the main control procedure of the processor of the MFP.

FIG. 8 is a flowchart illustrating the procedure of the information processes performed by the processor 131 of the MFP 10 if the administrator acquires the debug log of the built-in app. Hereinafter, the operation of the MFP 10 is described with reference to this flowchart. The procedure of the operations and the contents thereof explained below are examples. The procedure and the contents are not limited as long as the same result can be obtained.

If the malfunction of the built-in app occurs, the administrator switches the operation mode of the MFP 10 from the normal mode to the maintenance mode. The administrator designates the built-in app in which the malfunction occurs from the screen of the maintenance mode displayed on the touch panel 141 and inputs an acquisition button for acquiring the debug log of the corresponding built-in app.

That is, the processor 131 of the MFP 10 waits for the instruction of the acquisition of the debug log in ACT 21. If the acquisition of the debug log is instructed, the processor 131 determines YES in ACT 21 and proceeds to ACT 22.

The processor 131 confirms whether the acquisition flag of the app table 1341 is "1" in ACT 22. If the acquisition flag is not "1", that is, the acquisition flag is "0", the processor 131 determines NO in ACT 22 and ends the information process of the procedure illustrated in the flowchart of FIG. 8.

If the acquisition flag of the app table 1341 is "1", the processor 131 determines YES in ACT 22 and proceeds to ACT 23. The processor 131 extracts the folder of the debug log of the corresponding built-in app and confirms whether the debug log is acquired in ACT 23. If the debug log is not acquired, the processor 131 determines NO in ACT 23 and ends the information process of the procedure illustrated in the flowchart of FIG. 8.

If the debug log is acquired, the processor 131 determines YES in ACT 23 and proceeds to ACT 24. The processor 131 acquires an encryption key corresponding to the corresponding built-in app stored in the built-in app data record 401 in ACT 24. The processor 131 encrypts the debug log by using the encryption key in ACT 25. The processor 131 stores the debug log encrypted in the RAM 132 in ACT 26.

The processor 131 confirms whether the transmission destination of the debug log is stored in the built-in app data record 401 in ACT 27. If the transmission destination of the debug log is not stored, the processor 131 determines NO in ACT 27 and proceeds to ACT 28.

The processor 131 outputs the encrypted debug log of the built-in app to the storage medium via the medium interface 139 in ACT 28. With the above, the processor 131 ends the information process of the procedure illustrated in the flowchart of FIG. 8.

If the transmission destination of the debug log is stored, the processor 131 determines YES in ACT 27 and proceeds to ACT 29. The processor 131 transmits the encrypted debug log of the built-in app to the stored transmission destination in ACT 29. With the above, the processor 131 ends the information process of the procedure illustrated in the flowchart of FIG. 8.

As clearly described above, the processor 131 of the MFP 10 that is an example of the image processing device configures storage means by performing the processes of ACTS 1 to 4 of FIG. 6. That is, the MFP 10 stores the encryption key in correlation with the built-in application if the built-in application is installed.

The processor 131 of the MFP 10 configures encryption means by performing the processes of ACTS 21 to 25 of FIG. 8. That is, the MFP 10 encrypts the debug log according to the built-in application with the encryption key in correlation with the corresponding built-in application.

The processor 131 of the MFP 10 configures output means by performing the processes of ACTS 26 to 28 of FIG. 8. That is, the MFP 10 outputs the debug log encrypted by the encryption means.

In this manner, according to the present embodiment, if the administrator instructs the MFP 10 to install the built-in app, the package software is loaded. The program data of the built-in app, the metadata of the built-in app, and the encryption key included in the package software are stored in the built-in app data record 401. In addition, the folder of the debug log generated during the installation is stored in the built-in app data record 401. After the installation, the acquisition timing of the debug log and the transmission destination of the debug log are set in advance by the administrator on the debug log setting screen 100. Also, if the user instructs the execution of the built-in app, if the acquisition flag of the app table 1341 is "1", and the acquisition timing of the debug log is stored in the built-in app data record 401, the debug log is stored in the folder of the corresponding built-in app. Further, if the administrator acquires the debug log, the encryption key corresponding to the built-in app stored in the built-in app data record 401 is acquired. Also, the debug log encrypted by using the encryption key is stored in the RAM 132. If the transmission destination of the debug log is not stored in the built-in app data record 401, the encrypted debug log of the built-in app is automatically output to the storage medium. Therefore, the debug log of the desired built-in application can be collected by a simple operation.

If the transmission destination of the debug log is stored in the built-in app data record 401, the encrypted debug log of the built-in app is transmitted to the transmission destination. Therefore, the debug log can be transmitted to the transmission destination such as the administrator and the cloud server 30 by a simple operation.

Second Embodiment

Subsequently, a second embodiment is described.

According to the first embodiment, the encryption key of the built-in app is described on the assumption of being included in the package software.

In the second embodiment, a case where the encryption key is not included in the package software is assumed. In the drawings relating to the second embodiment and the description thereof below, the same elements as those in the first embodiment are designated by the same reference numerals. Therefore, the description of the same elements may be omitted.

Figure 9:
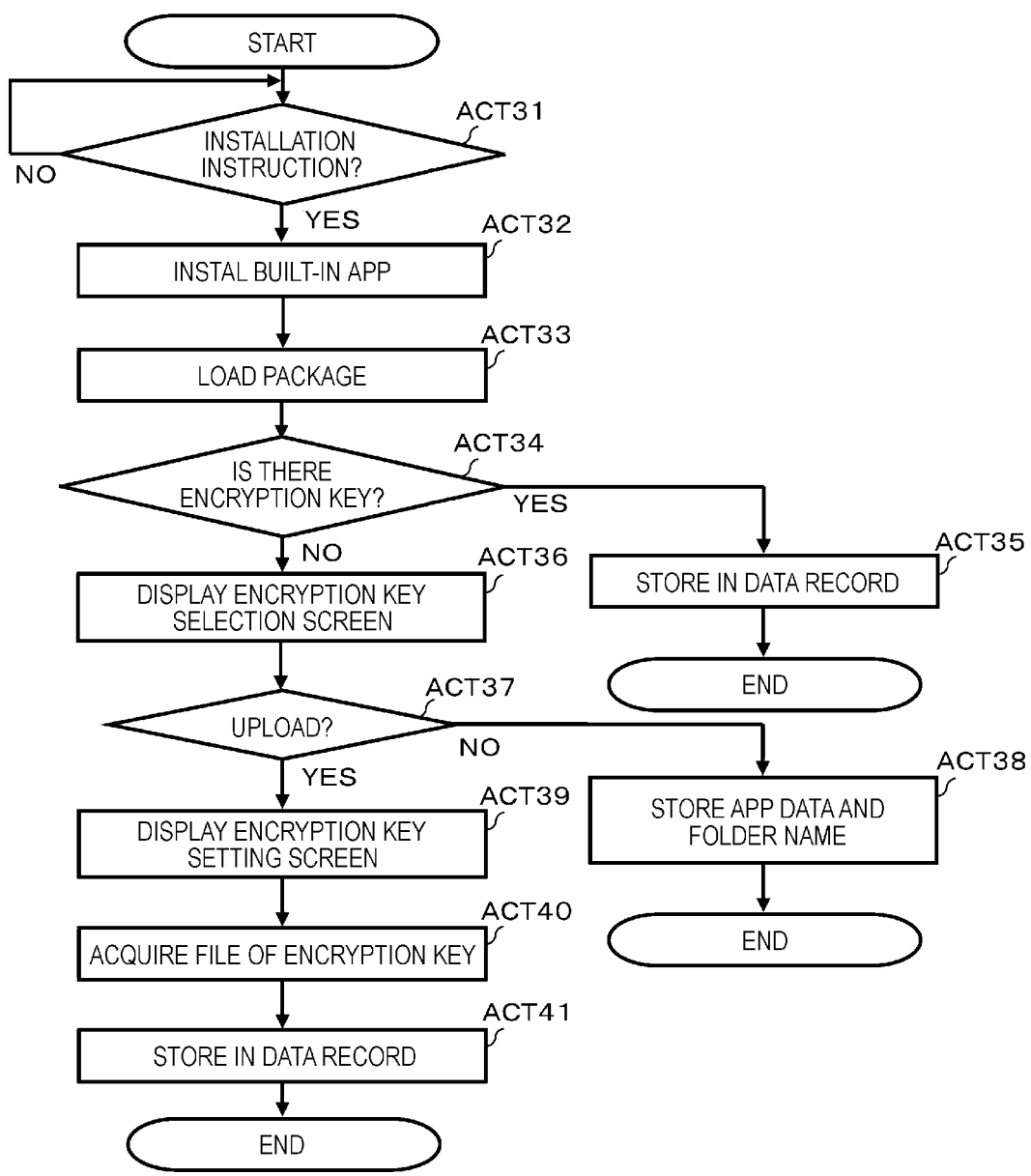
FIG. 9 is a flowchart illustrating a main control procedure of a processor of an MFP according to a second embodiment.

FIG. 9 is a flowchart illustrating the procedure of the information process executed by the processor 131 of the MFP 10 if the administrator installs the built-in app in the MFP 10. Hereinafter, the operation of the MFP 10 is described with reference to this flowchart. The procedure of the operations and the contents thereof explained below are examples. The procedure and the contents are not limited as long as the same result can be obtained.

The processor 131 of the MFP 10 waits for the instruction of the installation of the built-in app in ACT 31. If the installation of the built-in app is instructed, the processor 131 determines YES in ACT 31 and proceeds to ACT 32. The processor 131 installs the built-in app from the storage medium via the medium interface 139 in ACT 32.

The processor 131 loads the package software in ACT 33. The processor 131 confirms whether the encryption key is included in the package software loaded in the process of ACT 33 in ACT 34. If the encryption key is included, the processor 131 determines YES in ACT 34 and proceeds to ACT 35. The processor 131 stores the program data of the built-in app, the metadata, and the encryption key in the built-in app data record 401 in ACT 35. The processor 131 stores the folder name of the folder of the debug log generated during the installation of the package software in the built-in app data record 401. With the above, the processor 131 ends the information process of the procedure illustrated in the flowchart of FIG. 9.

If the encryption key is not included, the processor 131 determines NO in ACT 34 and proceeds to ACT 36. The processor 131 displays the encryption key selection screen 200 (see FIG. 10) for selecting whether to upload the encryption key to the touch panel 141 in ACT 36.

Figure 10:
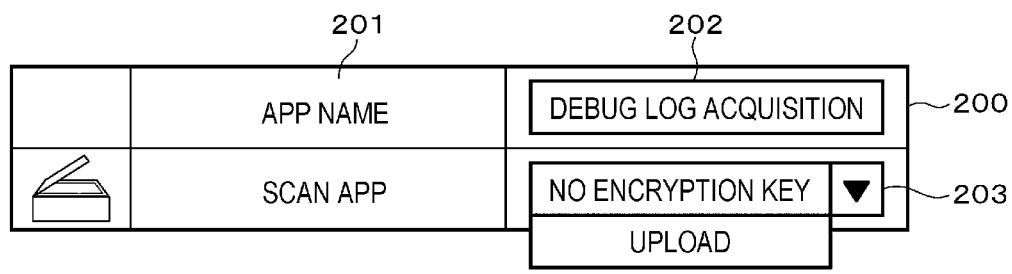
FIG. 10 is a schematic diagram illustrating an example of an encryption key selection screen.

FIG. 10 is a schematic diagram illustrating an example of the encryption key selection screen 200 according to the second embodiment. As illustrated in FIG. 10, an encryption key selection screen 200 includes a built-in app name field 201 and a debug log acquisition check field 202. The built-in app installed in the MFP 10 in advance is displayed on the built-in app name field 201. An image of a button 203 that enables to select any one of "no encryption key" or "upload" is displayed on the debug log acquisition check field 202. If the output without encrypting the debug log of the built-in app is desired, the administrator inputs "no encryption key". If the upload of the encryption key from the cloud server 30 to the MFP 10 is desired, the administrator inputs "upload". The encryption key selection screen 200 is not limited to the item of FIG. 10.

The description refers back to FIG. 9.

The processor 131 confirms whether the "upload" is input to the encryption key selection screen 200 in ACT 37. If the "upload" is not input, that is, "no encryption key" is input, the processor 131 determines NO in ACT 37 and proceeds to ACT 38. The processor 131 stores the program data and the metadata of the built-in app in the built-in app data record 401 in ACT 38. The processor 131 stores the folder name of the folder of the debug log generated during the installation of the package software in the built-in app data record 401. With the above, the processor 131 ends the information process of the procedure illustrated in the flowchart of FIG. 9.

If "upload" is input, the processor 131 determines YES in ACT 37 and proceeds to ACT 39. The processor 131 displays an encryption key setting screen 300 (see FIG. 11) in ACT 39.

Figure 11:
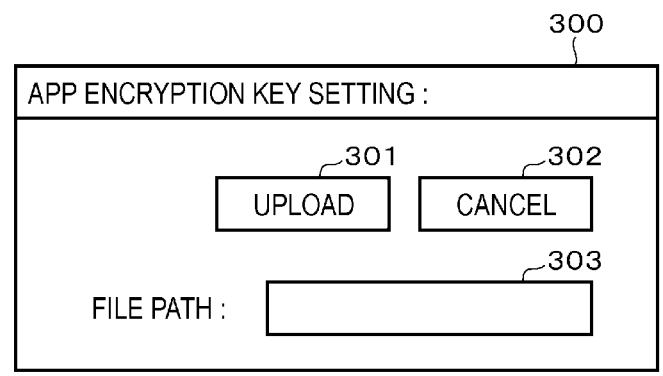
FIG. 11 is a schematic diagram illustrating an example of the encryption key setting screen.

FIG. 11 is a schematic diagram illustrating an example of the encryption key setting screen 300 according to the second embodiment. As illustrated in FIG. 11, the encryption key setting screen 300 includes an image of an upload button 301, an image of a cancel button 302, and a file path input field 303. The administrator inputs the file path to the file path input field 303 and inputs the upload button 301. However, the encryption key uploaded from the cloud server 30 is stored in the storage location designated by the file path. In case of cancelling the uploading of the file according to the encryption key, the cancel button 302 is input. The displayed content of the text data in FIG. 11 is an example.

The description refers back to FIG. 9.

The processor 131 acquires the encryption key stored in the storage location designated in the file path in ACT 40. The processor 131 stores the program data and the metadata of the built-in app together with the encryption key acquired in the process of ACT 39 in the built-in app data record 401 in ACT 41. The processor 131 stores the folder name of the folder of the debug log generated during the installation of the package software in the built-in app data record 401. With the above, the processor 131 ends the information process of the procedure illustrated in the flowchart of FIG. 9.

In the second embodiment, the process of ACT 24 in FIG. 8 is different from that in the first embodiment. That is, the processor 131 confirms whether there is an encryption key in ACT 24. If there is an encryption key, the processor 131 determines YES in ACT 24 and proceeds to ACT 25. If there is not an encryption key, the processor 131 determines NO in ACT 24 and proceeds to ACT 27.

As clearly described above, the processor 131 of the MFP 10 that is an example of the image processing device performs the processes of ACTS 34, 36, and 37 of FIG. 9 to configure reception means. That is, if there is not an encryption key in correlation with the built-in application, the MFP 10 receives the instruction whether to set an encryption key. If the instruction to set the encryption key is received by the reception means, the storage means stores the encryption key uploaded from the outside. If the instruction not to set the encryption key is received by the reception means, the output means outputs the debug log relating to the built-in application without encryption.

In this manner, in the second embodiment, a case where the encryption key is not included in the package software is assumed. An image of the button 203 that enables to select any one of "no encryption key" or "upload" is displayed on the encryption key selection screen 200. Therefore, the administrator can select whether to set the encryption key and then acquire the debug log of the built-in app.

In the above, the embodiments of the image processing device and the image processing method are described, but the corresponding embodiment is not limited thereto.

In the above embodiments, a case where the image processing device is the MFP 10 is exemplified. The image processing device is not limited to the MFP 10. For example, the image processing device may be a copying machine or a printer.

In the above embodiments, a case where the MFP 10 includes the built-in app database 40 is described. The built-in app database 40 may be a storage device built in the MFP 10 or may be a storage device attached outside the MFP 10.

In the above embodiments, whether to acquire the debug log in case of an error of the built-in app, whether to periodically acquire a debug log, and designation time in case of periodically acquiring the debug log are set in the item field 101 for setting the timing of acquiring the debug log of the built-in app are described. For example, with respect to the timing, the debug log may be acquired if the usage rate of the processor 131 is higher than the reference value, and the debug log may be acquired if the usage amount of the ROM 133 or the data memory 134 is larger than the reference value.

According to the embodiment, a case where the transmission destination of the debug log is the cloud server 30, the administrator, the maintenance person, and the like is described. For example, the debug log may be stored in the storage medium via the medium interface 139.

According to the second embodiment, a case where the encryption key is uploaded from the cloud server 30 to the MFP 10 is described. For example, an encryption key stored in a storage medium different from the storage medium for installing the built-in app may be uploaded to the MFP 10 via the medium interface 139.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising:
    a memory for storing an encryption key in association with an application comprising machine executable instructions; and
    a processor that performs operations for:
    installing the application and determining that an encryption key has been correlated with the application;
    in response to determining that the encryption key has not been correlated with the application, receiving, from a network equipment of a group of network equipment, an instruction as to whether to store the encryption key;
    encrypting a debug log relating to, and generated based on, execution of the application with the encryption key correlated with the application; and
    transmitting the debug log that has been encrypted using the encryption key to a transmission destination that has been set in advance, wherein the transmission destination is a network address associated with the network equipment of the group of network equipment,
    wherein the application is representative of an application data record of application data records generated based on the image processing device, and wherein the application data record comprises program data associated with the image processing device, metadata associated with the application, the encryption key, a folder name of the debug record as stored to the image processing device, an acquisition timing for acquiring the debug log, and the transmission destination.

2. The image processing device according to claim 1, wherein the processor performs further operations for:
    in response to determining that the encryption key is not associated with the application, receiving an instruction of to set the encryption key.

3. The image processing device according to claim 2, wherein the processor performs further operations for:
    in response to receiving an instruction to set the encryption key, storing the encryption key to the memory, wherein the encryption key is uploaded from outside of the image processing device.

4. The image processing device according to claim 2, wherein the processor performs further operations for:
    in response to receiving an instruction not the set the encryption key, outputting the debug log relating to the application without encrypting the debug log.

5. The image processing device according to claim 1, wherein the encryption key is a unique key associated with the application of a collection of applications, wherein the unique key is used to encrypt the debug log of the application.

6. An image processing method execution on an image processing device, comprising:
    storing an encryption key in associated with an application comprising machine executable instructions;
    installing the application and determining that an encryption key has been correlated with the application;
    in response to determining that the encryption key has not been correlated with the application, receiving, from an equipment of a group of equipment, an instruction as to whether to store the encryption key;
    encrypting a debug log relating to, and generated based on, execution of the application with the encryption key correlated with the application; and
    transmitting the debug log that has been encrypted using the encryption key to a transmission destination that has been set in advance, wherein the transmission destination is an address associated with the equipment of the group of networked equipment,
    wherein the application is representative of an application data record of application data records generated based on the image processing device, and wherein the application data record comprises program data associated with the image processing device, metadata associated with the application, the encryption key, a folder name of the debug record as stored to the image processing device, an acquisition timing for acquiring the debug log, and the transmission destination.

7. The image processing method according to claim 6, further comprising:
    in response to detecting that a malfunction of the application has occurred, switching an operation mode of an image processing device from a normal mode to a maintenance mode.

8. The image processing method according to claim 6, further comprising:
    in response to determining that there is no encryption key associated with the application, receiving an instruction to set the encryption key.

9. The image processing method according to claim 8, further comprising:
   in response to receiving the instruction to set the encryption key, storing the encryption key, wherein the encryption key is uploaded from outside of an image processing device.

10. The image processing method according to claim 8, further comprising:
    in response to receiving an instruction not to set the encryption key, outputting the debug log relating to the application without encrypting the debug log.

11. A diagnostic system for an image processing device, comprising:
    a memory for storing an encryption key in association with an application comprising machine executable instructions; and
    one or more processor that performs operations for:
    installing the application and determining that an encryption key has been correlated with the application;
    in response to determining that the encryption key has not been correlated with the application, receiving, from a device of a group of devices, an instruction as to whether to store the encryption key;
    encrypting a debug log relating to, and generated based on, execution of the application with the encryption key correlated with application; and
    transmitting the debug log encrypted using the encryption key to a transmission destination that has been set in advance, wherein the transmission destination is an address associated with the device of the group of devices,
    wherein the application is representative of an application data record of application data records generated for the image processing device, and wherein the application data record comprises program data associated with the image processing device, metadata associated with the application, the encryption key, a folder name of the debug record as stored to the image processing device, an acquisition timing for acquiring the debug log, and the transmission destination.

12. The diagnostic system according to claim 11, wherein the one or more processors perform further operations for:
    in response to determining that no encryption key has been set, receiving an instruction to set the encryption key in correlation with the application.

13. The diagnostic system according to claim 12, wherein the one or more processors perform further operations for:
    In response to receiving an instruction to set the encryption key, storing, to the memory, the encryption key that has been uploaded from outside the image processing device.

14. The diagnostic system according to claim 12, the one or more processors perform further operations for:
    In response to receiving an instruction not to set the encryption key, outputting the debug report associated with the application without encrypting the debug report.

15. The diagnostic system according to claim 11,
    wherein the encryption key is a unique key set for the application in order to encrypt the debug log of the application of a collection of applications.

* * * * *